United States Patent [19]

Hasegawa

[11] Patent Number: 5,055,662
[45] Date of Patent: Oct. 8, 1991

[54] PORTABLE INFORMATION RECORD MEDIUM HAVING LIQUID CRYSTAL AND PHOTOCONDUCTIVE LAYERS

[75] Inventor: Haruyoshi Hasegawa, Kawasaki, Japan

[73] Assignee: Kabushiki Kaisha Toshiba, Kawasaki, Japan

[21] Appl. No.: 386,263

[22] Filed: Jul. 28, 1989

[30] Foreign Application Priority Data

Aug. 31, 1988 [JP] Japan ................................. 63-214911

[51] Int. Cl.⁵ ..................... G06K 19/06; G11C 13/01
[52] U.S. Cl. .................................. 235/492; 235/380; 235/487; 365/108
[58] Field of Search ....................... 235/380, 487, 492; 365/108, 107

[56] References Cited

U.S. PATENT DOCUMENTS

| 3,978,320 | 8/1976 | McBride, Jr. ...................... 360/2 X |
| 4,392,719 | 7/1983 | Sekimoto ............................. 350/342 |
| 4,752,820 | 6/1988 | Kuroiwa et al. ..................... 365/108 |
| 4,799,770 | 1/1989 | Kahn et al. .......................... 365/108 X |
| 4,810,868 | 3/1989 | Drexler ................................ 235/487 |
| 4,841,128 | 6/1989 | Grötrup et al. ...................... 235/491 |
| 4,954,985 | 9/1990 | Yamazaki ............................ 365/108 |

FOREIGN PATENT DOCUMENTS 61-48176 3/1986 Japan .
63-6856 2/1988 Japan .

Primary Examiner—Stuart S. Levy
Assistant Examiner—Steven M. DuBois
Attorney, Agent, or Firm—Foley & Lardner

[57] ABSTRACT

A portable prepaid card is disclosed comprising a substrate on which a photoconductive layer, a liquid crystal layer, and a transparent electrode plate are built up in this order. When an optical image is radiated on the photoconductive layer through the liquid crystal layer, the exposed regions and the unexposed regions of the photoconductive layer have different volume resistances. In this state, if a predetermined voltage is applied from the outside between the electrode plate and the photoconductive layer, a visible image corresponding to the radiated optical image is fixed in the liquid crystal layer.

12 Claims, 5 Drawing Sheets

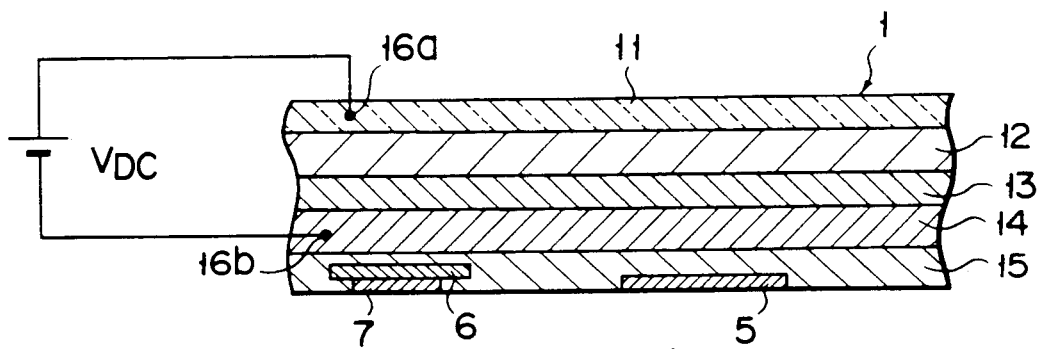
F I G. 3
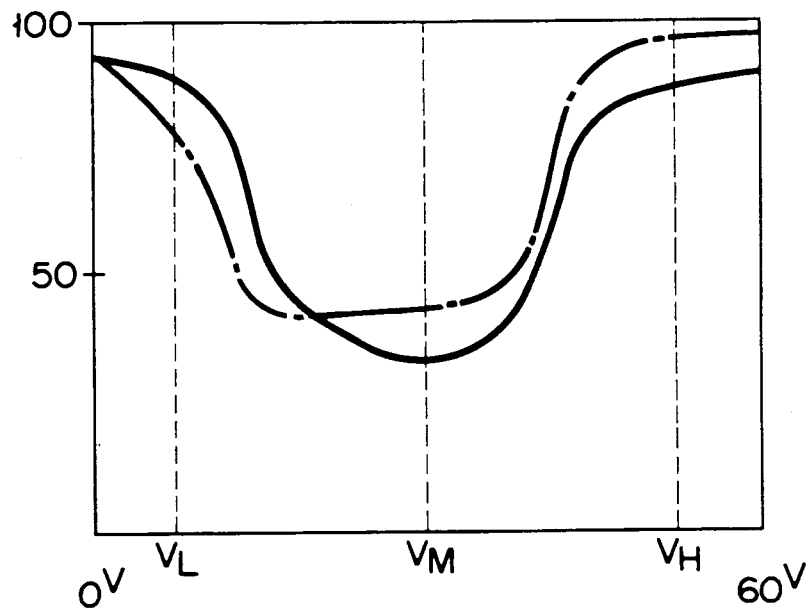
F I G. 4

PORTABLE INFORMATION RECORD MEDIUM HAVING LIQUID CRYSTAL AND PHOTOCONDUCTIVE LAYERS

BACKGROUND OF THE INVENTION

1. Field of the Invention

This invention relates to a portable information record medium such as a prepaid card 2. Description of the Related Art Nowadays, cashless purchase and sale has become widespread. Cash is being replaced by cards. Particularly, prepaid cards are finding growing use. Well-known examples of prepaid cards are one which permits cashless use of public telephones and another one which enables cashless purchases of railway tickets Most of these cards can magnetically record the current state of use, e g., the balance on the card. On the surface of such a card, a plurality of amounts of money are printed. As the amount of money used on the card increases, holes are punched at the positions corresponding to the amounts of money that have been reached, thereby showing the user roughly how much money is left. However, the user of the card is unable to know from the card a more exact state of its use at the moment.

Because of this, prepaid cards have been developed in which the current state of use can be printed on the surface of the card as visible information. Japanese Patent Disclosure No. 61-48176 discloses such cards wherein the balance on the card and the date of use are printed on the surface of the card. However, this type of card does not permit information once printed to be erased or rewritten. Moreover, since the surface area of a card is limited, the amount of printable information is limited. Therefore, use of these cards is limited.

A conceivable method of displaying visible information is to provide the card with a seven-segment liquid crystal display. In this case, however, a power source needs to be provided in the card. In addition, the kinds of information that can be displayed are limited.

SUMMARY OF THE INVENTION

It is therefore an object of the present invention to provide a portable information record medium wherein visible information in any shape can be written and erased repeatedly without the provision of a power source in the card.

In accordance with these and other objects there is provided according to the invention an information record medium comprising a portable board; image holding means provided on the board, for holding information in the form of a visible image; and image forming means provided on the board, for erasing the image held in the image holding means and forming an image to be held in the image holding means in response to an external signal.

With an information record medium constructed as described, information is held as a visible image by the image holding means, making it possible to freely display various kinds of information. The image in the image holding means can be rewritten by the image forming means and new information can be displayed freely.

BRIEF DESCRIPTION OF THE DRAWINGS

FIGS. 1 through 7 show a prepaid card according to an embodiment of this invention in which:

FIG. 1 is a plan view of the card;

FIG. 2 is a reverse side view of the card;

FIG. 3 is a sectional view taken along line III—III in FIG. 2;

FIG. 4 is a view showing the transmittance characteristics of a liquid crystal layer;

FIG. 5 is a view showing an equivalent drive circuit of the liquid crystal layer;

FIG. 6 is a sectional view schematically showing the exposure process of the liquid crystal layer.

DETAILED DESCRIPTION OF THE PREFERRED EMBODIMENTS

With reference to the accompanying drawings, an embodiment of this invention will be described in greater detail.

Figure 1:
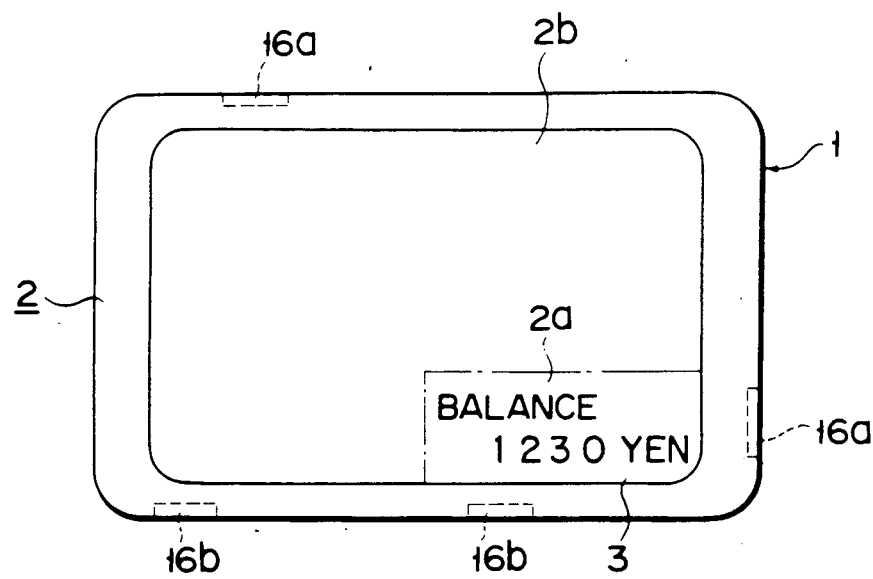
Figure 2:
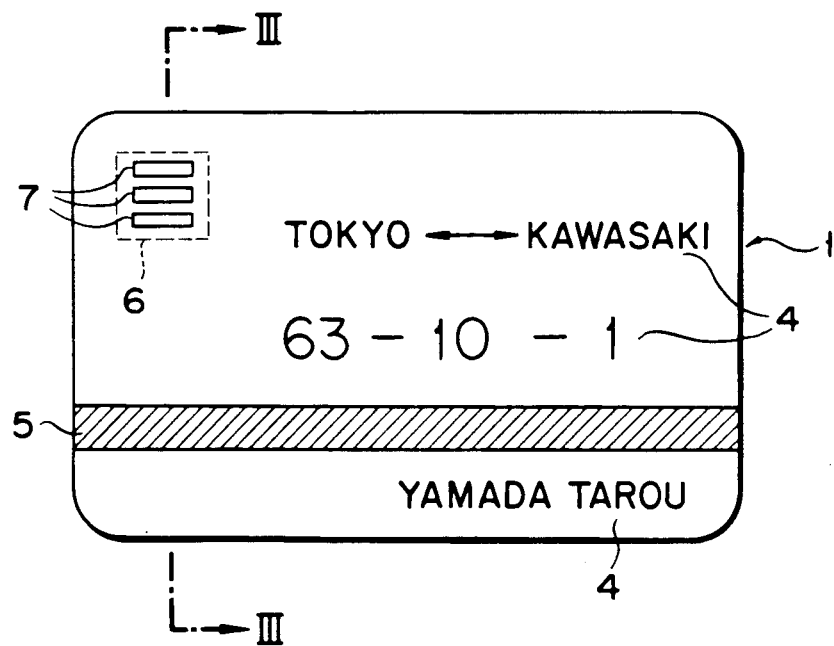

FIGS. 1 and 2 show a prepaid-card commuter pass pursuant to the present invention and used to pay fares on transportation facilities such as railways.

Card 1 has visible information display section 2 serving as image holding means provided on its surface. Display section 2 displays arbitrary visible information on the current state of use of the card, e.g., the balance on the card. Display section 2 is designed to permit arbitrary visible information to be erased therefrom and written therein repeatedly. In the embodiment of this invention, display section 2 is divided into first region 2a and second region 2b, and visible information can be erased from and written into these regions independently of each other.

Characters 4 of the applicable railway section, the term of validity, the user's name, etc. are printed in ink on the reverse side of card 1. Magnetic stripe 5 and contacts 7 of integrated circuit 6 are also provided on the reverse side of card 1. In stripe 5 and IC 6 are magnetically and electrically recorded signal form desired information, e.g., information on the current state of use of the card. Information can be exchanged between an external device, not shown, and card 1 by means of magnetic stripe 5 and IC 6. Magnetic stripe 5 and IC 6 constitute recording means in this invention.

As is shown in FIG. 3, card 1 includes generally rectangular substrate 14 of portable size. The upper side of substrate 14 is covered with photosensitive layer 13 that is photoconductive, liquid crystal layer 12 as image holding means and transparent electrode plate 11 in this order. The underside of board 14 is covered with fixed protective layer 15. Magnetic stripe 5 and IC 6 are embedded in this protective layer.

For transparent electrode plate 11, a high-molecular-weight polymer film, such as a polyarylate film, or glass coated with indium oxide ($In_2O_3$) or indium tin oxide (ITO) is used.

For liquid crystal layer 12, a nematic-cholesteric phase transition type liquid crystal, which is a memory type liquid crystal, is used. For the phase transition type liquid crystal, a mixed liquid crystal of memory type and phase transition type is used, which is made by mixing a nematic liquid crystal comprising MBBA (p-methoxybenzylidene-p'-n-butyl aniline) for example and a cholesteric liquid crystal comprising COC (cholesteryl oleyl carbonate), for example.

For photosensitive layer 13, selenium or an organic photoconductive material (OPC), which is used in electron photography, is used.

As FIGS. 1 and 3 show, electrode plate 11 has a couple of contacts 16a corresponding to first region 2a and second region 2b. Substrate 14 is provided with a couple of contacts 16b corresponding to first region 2a and second region 2b, and photosensitive layer 13 is electrically connected through substrate 14 to contacts 16b. Using contacts 16a and 16b a voltage $V_{DC}$ can be applied between electrode plate 14 and photosensitive layer 13 by means of an external device. Contacts 16b are grounded inside card 1.

The characteristics of the memory type liquid crystal constituting liquid crystal layer 12 and the methods by which visible information is written and erased by the use of a combination of this liquid crystal and photosensitive layer 13 will now be described.

It is known that memory type liquid crystal of the nematic-cholesteric phase transition type shows transmittance T under the applied voltage $V_{DC}$, as shown in FIG. 4, when a suitable vertical orientation treatment is applied to the surface of transparent electrode plate 11. That is, when the voltage applied to liquid crystal layer 12 is 0V (no-load state), the liquid crystal molecules are in a planar structure wherein the molecules near electrode plate 11 are arranged perpendicularly to the electrode plate and the molecules in the intermediate layer are arranged parallel with the electrode plate and twisted in a spiral form. When applied voltage $V_{DC}$ is below $V_L$ as shown in FIG. 4, the optical transmittance of liquid crystal layer 12 is higher than about 90%.

Next, when voltage $V_M$ is applied to liquid crystal layer 12, the planar structure of the liquid crystal molecules is broken up and the liquid crystal molecules assume a focal conic structure (specific conic structure of cholesteric liquid crystals) wherein the molecules are arranged parallel to electrode plate 11 with the axis of the spiral turned 90°. This causes light scattering and therefore the transmittance of liquid crystal layer 12 drops to less than 50%. This condition is maintained even after the applied voltage $V_M$ is removed (cut off). Then, when the applied voltage becomes $V_M$, the liquid crystal molecules are oriented uniformly perpendicular to electrode plate 11 (the homeotropic structure). The liquid crystal layer is designed to provide light transmittance of almost 100% when voltage $V_H$ is applied. In this case, a few seconds after applied voltage $V_H$ is removed, liquid crystal layer 12 returns to the initial state (no-load state).

Figure 5:
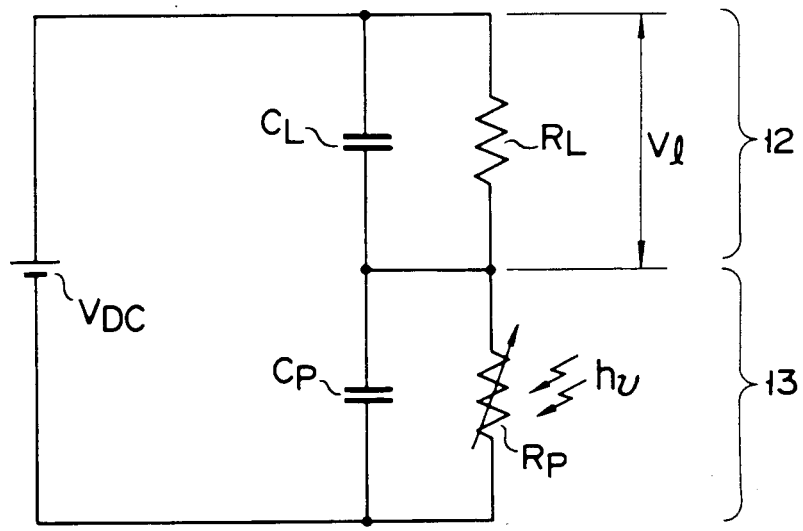

Visible information is written in or erased from liquid crystal layer 12 by utilizing the above-mentioned characteristics of the liquid crystal, and the equivalent drive circuit is shown in FIG. 5. In FIG. 5, $C_L$ and $R_L$ represent the capacity C component and the volume resistance of liquid crystal layer 12, and Cp and Rp represent the capacity C component and the volume resistance of photosensitive layer 13.

Figure 6:
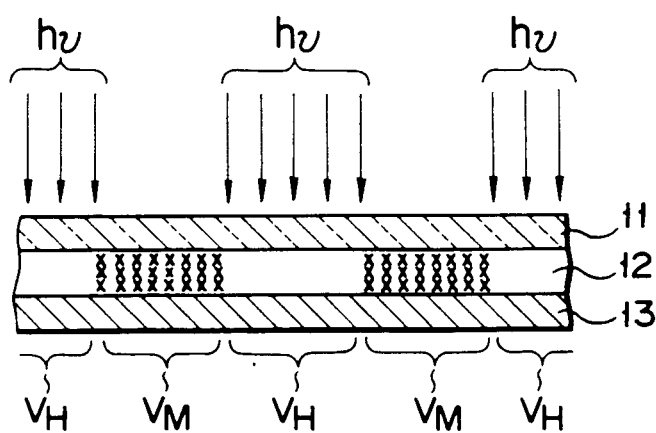

When photosensitive layer 13 receives light $h\nu$, its volume resistance Rp varies, thereby varying the voltage Vl applied to liquid crystal layer 12. To be more specific, when light $h\nu$ falls on photosensitive layer 13, the volume resistance Rp of layer 13 deceases, causing a higher voltage Vl to be applied to liquid crystal layer 12. When light $h\nu$ is not radiated on photosensitive layer 13, the volume resistance Rp of layer 13 continues to have a high resistance and therefore the voltage Vl applied to liquid crystal layer 12 stays at a low level. Accordingly, it is possible to form visible information, that is, a desired visible image by exposing the surface of card 1 to light $h\nu$ according to an image, as shown in FIG. 6, for example, and applying voltage $V_{DC}$ from outside to liquid crystal layer 12 so that the applied voltage to the white (exposed) areas of the image becomes $V_H$ and the applied voltage to the dark (unexposed) area becomes $V_{DC}$. This visible image is held even after the applied voltage $V_{DC}$ is removed.

The visible image is erased by applying, with card 1 not exposed to light, voltage $V_{HH}$ to liquid crystal layer 12 so that $V_L = V_H$.

With the arrangement described, an arbitrary visible image (visible information) can be written repeatedly into prepaid card 1. Therefore, each time card 1 is used, the state of its use is written in liquid crystal layer 12 and the user can easily see from the card the exact state of use including the balance. A power source need not be provided in prepaid card 1, nor is there any limit on the use of card 1 and the kind of information that can be displayed.

Description will now be made of use of prepaid card 1 described above as a commuter pass for a transportation facility, such as a railway, in which the commuter pass is used with an automatic ticket examining machine (an external device). This embodiment is intended to provide a prepaid card with the added function of an ordinary commuter pass and to make automatic ticket examination and automatic fare adjustment possible by use of this card which is inserted into an automatic ticket examining machine. In this case, as shown in FIGS. 1 and 2, the balance on card 1 before a ticket is sold is displayed as visible information 3 in region 2a of information display section 2 and information on the sale of a ticket, for example, is displayed in region 2b. On the reverse side of card 1, information on the commuter ticket, such as the applicable railway section and the term of validity is printed with characters 4. The balance on the card in addition to the applicable railway section and the term of validity are magnetically or electrically recorded in magnetic stripe 5 and IC 6.

Figure 7A:
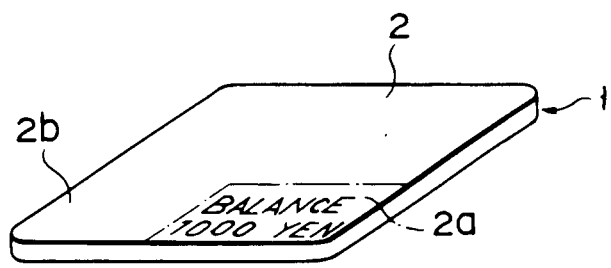
FIGS. 7A through 7E are perspective views schematically showing the rewriting process of the card.
Figure 7B:
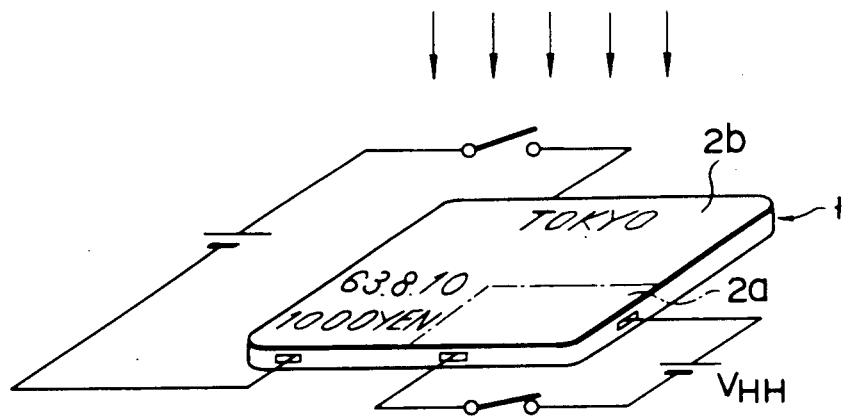
Figure 7C:
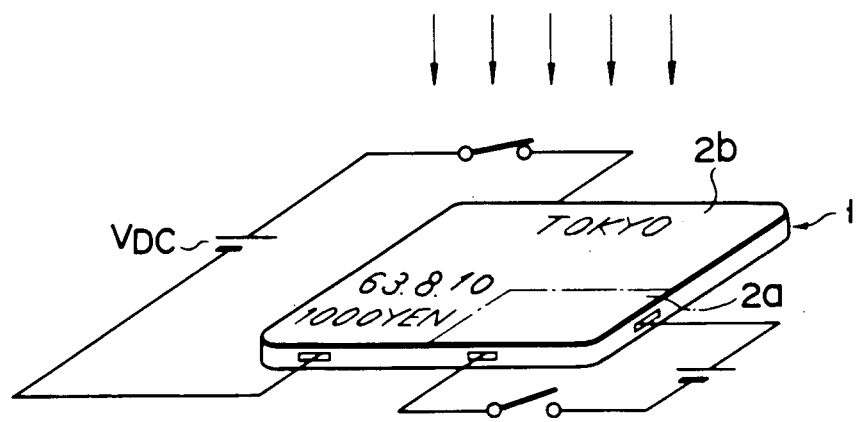

When the user passes through a ticket gate using card 1, he inserts the card into an automatic ticket examining machine, not shown, at a station where a train is boarded, while the balance on the card of "¥1000" is displayed in display region 2a, as shown in FIG. 7A. Whereupon, the automatic ticket examining machine reads the information on card 1 from magnetic stripe 5 and IC 6 of the card, and, as shown in FIG. 7B, voltage $V_{HH}$ for erase is applied through contacts 16a and 16b to display region 2a, thereby erasing the displayed information in region 2a. At the same time, the automatic ticket examining machine projects to display region 2b of card 1 an optical image showing information on the sale of the ticket such as the station name "Tokyo", from which the trip is started, the balance at the moment "¥1000" and the date of use "Aug. 10, 1988". Then, as is shown in FIG. 7C, a suitable voltage $V_{DC}$ is applied through contacts 16a and 16b to form a visible image in region 2b. When the applied voltage $V_{DC}$ is then removed, the visible image is fixed in display region 2b.

As described above, after the visible image (balance) in display region 2a is erased and the visible image (information on the sale of the ticket) is fixed in display region 2b, card 1 is ejected from the automatic ticket examining machine and returned to the user. Whereupon, the user can easily check with the visible image the station where he takes a train and the possible extra distance he can ride beyond the destination according to automatic fare adjustment.

Figure 7D:
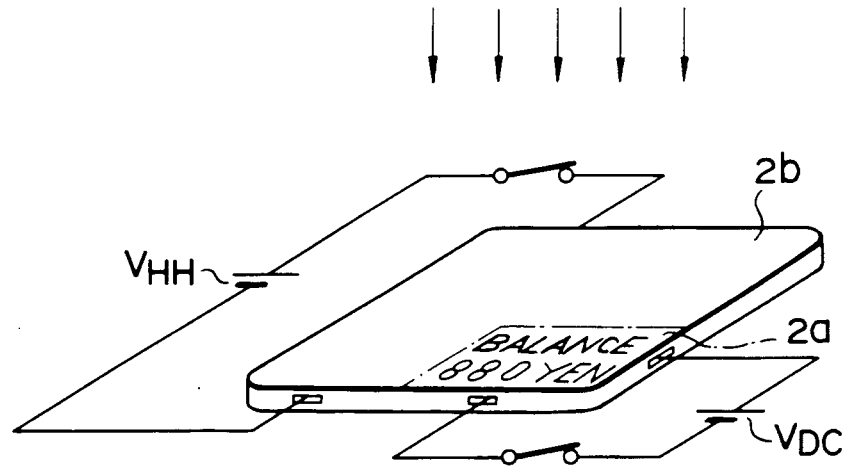

When the user arrives at the destination and passes through the ticket gate, he inserts card 1 in the condition described above into the automatic ticket examining machine. The ticket examining machine applies voltage $V_{HH}$ for erase through contacts 16a and 16b to display section 2b, thereby erasing the visible image in region 2b, as is shown in FIG. 7D.

Upon erasing, or prior to erasing, the visible image, the automatic ticket examining machine magnetically or electrically reads information from magnetic stripe 5 and IC 6 and compares the actual station of which the user has disembarked with the usable railway section of card 1, and also compares the date of use with the term of validity of card 1. If the result of the above comparison shows that the distance the user traveled exceeded the usable railway section of the card, or the date of use is past the term of validity, an excess fare is subtracted from the balance on card 1 and the balance is updated. In other words, the amount due over the usable range of the commuter pass is paid automatically from the balance on the card.

Figure 7E:
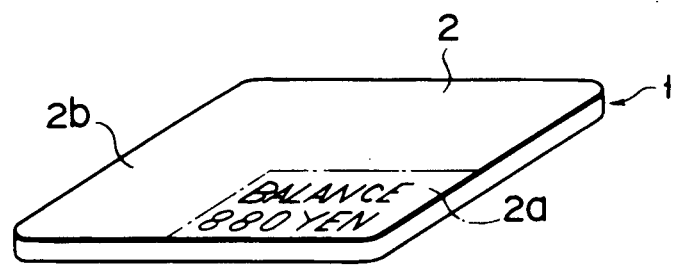

When the balance is updated (in this case, the information in magnetic stripe 5 and IC 6 is also updated), the automatic ticket examining machine projects an image of the balance after the fare adjustment onto display region 2a, when, under this condition, a suitable voltage $V_{DC}$ is applied through contacts 16a and 16b, a visible image is formed in region 2a. Then, when the applied voltage $V_{DC}$ is removed, the visible image described is fixed in display region 2a of display section 2, as shown in FIG. 7E.

Card 1, in which the visible image in display region 2b has been erased and a visible image of the balance "¥880" according to the fare adjustment has been fixed in display region 2a in the manner described, is ejected from the automatic ticket examining machine and returned to the user. The user may easily check the balance on card 1 by the visible image.

As has been described, when thus-constructed prepaid card 1 is used as a commuter pass for transportation facilities such as railways, ticket examination and fare adjustment can be done automatically. Further, the user can easily know the exact state of use of the card from the card itself. There is no need to mount a power source in card 1, nor is there any limit on the use of card 1 and the kind of information that can be displayed. Hitherto, even when an automatic ticket examining machine was installed, if it was necessary to pay the fare for the extra distance, the passenger had to buy a ticket for automatic ticket examination from a fare adjusting machine by using a prepaid card, to get through the ticket gate. According to this embodiment, such a cumbersome process as described can be eliminated, and fare adjustment can be done only with an automatic ticket examining machine without going to the ticket window or using a fare adjusting machine. Therefore, this invention provides a very convenient means of using transportation facilities.

According to this embodiment, prepaid card 1 is constructed such that visible information display section 2 is divided into a plurality of regions and either the writing or erasing step only is done for each region when card 1 passes through the automatic ticket examining machine. Therefore, the time for writing or erasing information can be shortened and automatic ticket examination can be done quickly.

As described above, card 1 comprises a visible information display section made by interposing a liquid crystal layer between a transparent electrode plate and a photosensitive layer having photoconductivity, and a magnetic stripe or an IC, whereby information such as the balance on the card can be recorded in the form of a visible image (visible information) for the user or in the form of signals easily readable by a handling machine.

Thus, the user can easily know the correct balance on the card from the visible information display section and the card handling machine can easily read the correct balance on the card from the magnetic stripe or IC. Further, the information recorded in the form of an image in the visible information display section can be rewritten in response to an external signal without any internal power source. This information record medium permits arbitrary visible information to be erased and written in repeatedly. There are no limits on the display of information and use of the card.

The easy-to-handle card lends itself to speedy processing The use of a high-molecular-weight polymer film for the transparent electrode plate imparts strength to the card to protect against breakage.

In the above embodiment, description has been made of a prepaid card for use of transportation facilities, but this invention is not limited to the above embodiment and can be applied to various types of prepaid cards for telephones and highway fees, for example.

This invention can also be applied to cash cards and credit cards.

Obviously, modifications and variations may be made without departing the spirit and scope of this invention.

What is claimed is:

1. A portable information record medium for displaying a visible image in accordance with an optical image radiated on the medium from outside, the medium comprising:

a portable substrate;

image holding means, provided on the substrate, for holding information in the form of a visible image, said image holding means including a liquid crystal layer having liquid crystal molecules whose orientation change in response to an applied voltage; and image forming means, provided between the image holding means and the substrate, for forming a visible image, corresponding to a radiated optical image, in the image holding means, the image forming means including a photoconductive layer having an electrical resistance variable in accordance with the radiated optical image, a part of the photoconductive layer, which has been exposed to light, having an electrical resistance different from that of other parts of the photoconductive layer such that an exposed part of the liquid crystal layer, which is opposite the light-exposed part of the photoconductive layer, is subject to a voltage different from a voltage applied to other parts of the liquid crystal layer.

2. A record medium according to claim 1, further comprising contacts through which voltage is applied between a transparent electrode plate and the photoconductive layer.

3. A record medium according to claim 1, wherein the liquid crystal layer includes a mixed memory/phase-transition liquid crystal.

4. A record medium according to claim 1, further comprising a transparent electrode plate which includes a high-molecular-weight polymer film and an oxide film formed on the high-molecular-weight polymer film.

5. A record medium according to claim 1, wherein the liquid crystal layer comprises first and second display regions to which voltage can be applied mutually independently.

6. A record medium according to claim 1, further comprising recording means, provided on the substrate, for recording information in the form of machine-readable signals.

7. A record medium according to claim 6, wherein the recording means comprises a recording section for recording the information magnetically.

8. A record medium according to claim 7, wherein the recording section comprises a magnetic stripe on the substrate.

9. A record medium according to claim 6, wherein the recording means comprises a recording section for recording the information electrically.

10. A record medium according to claim 9, wherein the recording section comprises an integrated circuit provided on the substrate.

11. A portable information record medium comprising:

a portable substrate;

a liquid crystal layer provided on the substrate to hold information in the form of a visible image, the liquid crystal layer having liquid crystal molecules whose orientation changes in response to an applied voltage;

image forming means, including a photoconductive layer between the substrate and the liquid crystal layer, and a transparent electrode plate provided on the liquid crystal layer, for erasing a first image held in the liquid crystal layer and for forming a second image in the liquid crystal layer by changing voltage applied to the liquid crystal layer in response to an external signal, the photoconductive layer having electrical resistance varying in accordance with a radiated optical image, a part of the photoconductive layer, which has been exposed to light, having an electrical resistance different from that of other parts of the photoconductive layer such that an exposed part of the liquid crystal layer, which is opposite the light-exposed part of the photoconductive layer, is subject to a voltage different from a voltage applied to other parts of the liquid crystal layer; and recording means, provided on the substrate, for recording the information in the form of machine-readable signals.

12. A portable information record medium for displaying a visible image in accordance with an optical image radiated on the medium from outside, the medium comprising:

a portable substrate having an electrode;

image holding means, provided on the substrate, for holding information on a state of use of the medium in the form of a visible image, said image holding means including a liquid crystal layer having liquid crystal molecules whose orientation changes in response to an applied voltage; and voltage applying means, provided on the substrate, for applying voltage to the liquid crystal layer to erase a first image held in the image holding means and to form a second image in the image holding means in response to an external signal, said voltage applying means including a transparent electrode plate provided on the liquid crystal layer, voltage being applied between the electrode and the transparent electrode plate, and a photoconductive layer arranged between the liquid crystal layer and the substrate and having an electrical resistance variable in accordance with a radiated optical image, a part of the photoconductive layer, which has been exposed to light, having an electrical resistance different from that of other parts of the photoconductive layer such that an exposed part of the liquid crystal layer, which is opposite the light-exposed part of the photoconductive layer, is subject to a voltage different from a voltage applied to other parts of the liquid crystal layer.

* * * * *